No. 617,877. Patented Jan. 17, 1899.
E. G. HARRIS.
AUTOMATIC REGULATOR FOR WIND WHEELS.
(Application filed Aug. 12, 1897.)
(No Model.) 2 Sheets—Sheet 1.
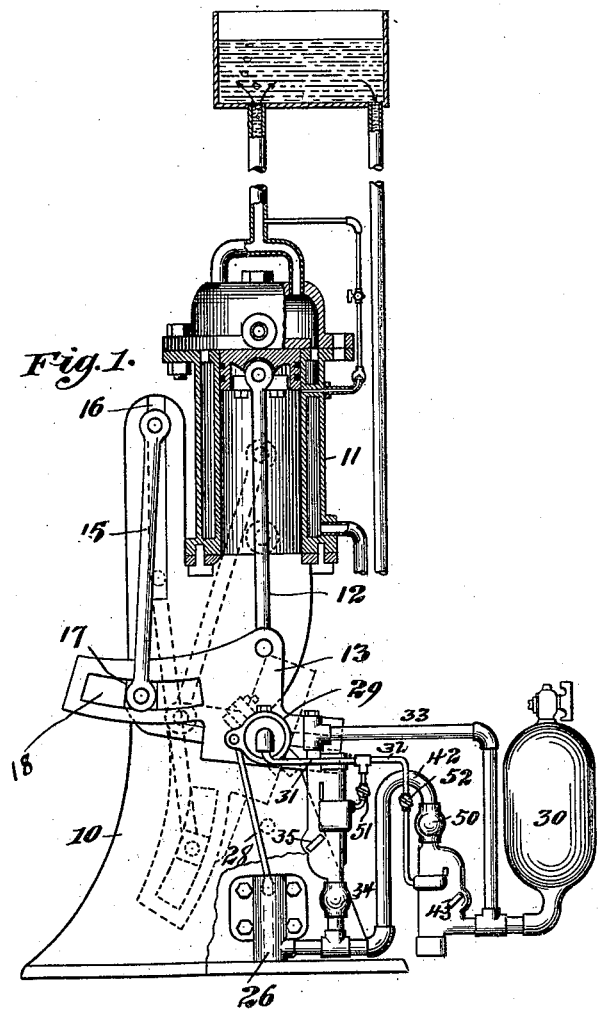
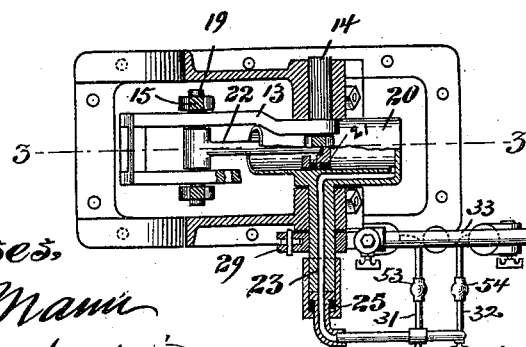

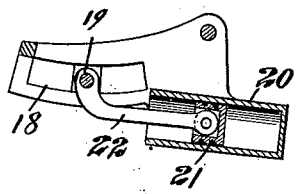
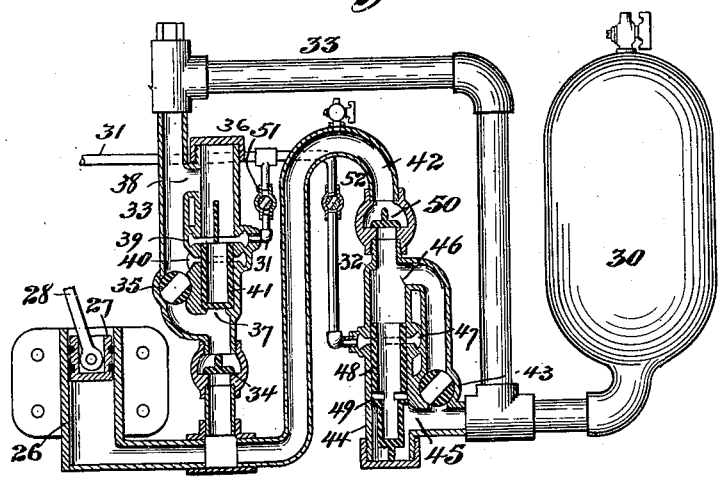

UNITED STATES PATENT OFFICE.

ELMO G. HARRIS, OF ROLLO, MISSOURI.

AUTOMATIC REGULATOR FOR WIND-WHEELS.

SPECIFICATION forming part of Letters Patent No. 617,877, dated January 17, 1899.

Application filed August 12, 1897. Serial No. 647,938. (No model.)

*To all whom it may concern:*

Be it known that I, ELMO G. HARRIS, of the city of Rollo, county of Phelps, and State of Missouri, have invented certain new and useful Improvements in Governors, of which the following is a specification.

This invention relates to an improvement in governors, and more particularly to a governor for reciprocating motion, and, while applicable to other motors, is in the particular form herein shown and described more particularly adapted for use in connection with that class of motors known as "windmills." In motors of this class the energy of the wind passing through the windmill varies with the cube of its velocity, and therefore to realize a constant fraction of this energy in useful effect the work done by the windmill should also vary with the cube of the wind velocity. In practice this condition is not realized with pumping-windmills, for in the case of this class of machines the useful work is directly proportional to the velocity of the windmill, the length of stroke being constant, and it is neither theoretically correct nor practicable to have the velocity of the windmill vary with the cube of the wind velocity. For these reasons it is one of the objects of my invention to vary the length of stroke of the pump, increasing the same when the velocity of the wind increases, thereby causing the engine to do more work per stroke at a high speed than at a low speed.

My present invention is particularly adapted for use in connection with a pump such as is set forth in Letters Patent of the United States No. 580,687, granted to me April 13, 1897, and while the invention, as already stated, is not limited to this particular application it posseses certain peculiar advantages when used in that connection in addition to those already pointed out by reason of the wide variation between the limits of the work done in operating a pump of that description, which variation renders the variation of the length of stroke so much the more necessary.

To these ends, therefore, my invention consists in certain features, which I will now proceed to describe and will then particularly point out in the claims.

In the accompanying drawings, Figure 1 is a side elevation, partly in section, of a machine embodying my invention in one form. Fig. 2 is a view, partly in plan and partly in broken section, of the structure shown in Fig. 1. Fig. 3 is a detail sectional view taken on the line 3 3 of Fig. 2, showing the rocker and its associated parts; and Fig. 4 is a vertical sectional view, on an enlarged scale, of the governor-pump and its connections.

In the said drawings, 10 represents a suitable frame which supports the various portions of the apparatus, and 11 represents a pump mounted on said frame, the pump shown in the present instance being an air-compressing pump, which is shown merely for the purposes of illustration. The piston-rod 12 of this pump is connected eccentrically to a rocker 13, which is mounted on a shaft 14, supported in suitable bearings in the frame 10. Motion is imparted to this rocker by means of a pitman 15, the upper end of which moves in suitable guides 16 on the frame 10 and which in practice is connected to the reciprocating rod of a windmill or to a reciprocating part of any other motor adapted to impart to the said pitman a reciprocating motion. The lower end of the pitman 15 is pivotally connected to a block 17, which is adapted to slide in a slot 18 in the rocker-arm, so as to vary its distance from the center of oscillation of said arm. In practice I prefer to divide the rocker-arm into two parts, as shown more particularly in Figs. 2 and 3, and in this case there are two pitmen employed and duplicate slots 18 and blocks 17, the several parts being connected by means of a pin 19. In the particular form of apparatus shown, which is used in conjunction with an air-compressor and in which the upper limit of the stroke of the air-pump should be constant, the slot 18 is arc-shaped, having the upper pivotal point of the pitman 15 as a center; but in the case of the application of the device to pumps other than compressing-pumps the slot 18 may be made straight for simplicity of construction.

The position of the lower end of the pitman 15 in the slot 18 is controlled by means of a motor mounted on the rocker, so as to oscillate therewith, and consisting of a cylinder 20, open at one end and containing a piston 21, which is connected by means of a piston-rod 22 with the pin 19 at the lower end of the pitman 15. The liquid which supplies the pressure to operate the piston 21 is given access to the interior of the cylinder 20 by means of a passage 23, formed partly in the cylinder and partly in one of the arms of the shaft 14 of the rocker. A pipe 24, connecting with the passage 23 by means of a stuffing-box 25, permits the rocker to oscillate freely without breaking the connection between the fixed pipe 24 and the oscillating shaft 14.

26 indicates a small pump the cylinder of which contains a piston 27, the rod 28 of which is connected to and actuated from the rocker. In the construction shown this connection is effected by means of a collar 29, secured on the shaft 14 and adjustable around said shaft, so as to vary the stroke of the pump 26 within the limits of its adjustment. This adjustment of the collar 29 is effected by fitting the same on the shaft 14, so as to be rotatable around the same, said collar being secured after adjustment by a set-screw 29$^a$. The cylinder of the pump 26 is connected by means of a double system of pipes with a receiver 30, and this system is further connected with the pipe 24 and cylinder 20 by means of pipes 31 and 32. Extending from the pump 26 to the receiver 30 is a pipe 33, which is provided at a point adjacent to the pump with a check-valve 34, which is adapted to open when liquid under pressure from the pump is forced against its under side. Beyond the check-valve 34 there is located in the pipe 33 a regulating valve or cock 35, by means of which the area of the passage in the pipe 33 at that point may be regulated. Immediately adjacent to the regulating-valve 35 is a by-pass comprising a valve-chamber 36, having at its lower end a port 37, which communicates with the pipe 33 between the check-valve 34 and the regulating-valve 35. At its upper end the valve-chamber 36 is provided with a second port 38, which opens into the pipe 33 at a point above the regulating-valve 35. Intermediate between the ports 37 and 38 the valve-chamber 36 is provided with a circular port or groove 39, which communicates with the pipe 31, and below this port 39 the valve-chamber has a similar port 40, which communicates with the pipe 33 immediately above the regulating-valve 35. In the valve-chamber 36 and controlling the ports thereof is a cylindrical valve 41.

From the receiver 30 back to the pump 26 extends a pipe 42, which is provided with a regulating-valve 43, similar to the regulating-valve 25, and adjacent to this valve is a by-pass comprising a valve-chamber 44, having ports 45 and 46 opening into the pipe 42 on opposite sides of the regulating-valve 43, and an intermediate annular port 47, which communicates with the pipe 32. Within the valve-chamber 44 is a cylindrical valve 48, so supported that the pressure fluid may have access to its under side, and said valve is provided with a port 49, which when caused to register with the port 47 establishes a communication between the pipe 32 and the interior of the valve-chamber, and consequently between the pipe 32 and the pipe 42. In the pipe 42, at a point beyond the valve-chamber 44, is located a check-valve 50. The pipes 31 and 32 are respectively provided with regulating valves or cocks 51 and 52.

The pipes 33 and 42, pump 26, motor-cylinder 20, and the various connecting pipes and passages are filled with a suitable non-compressible liquid, such as oil, the receiver 30 being also filled, except as to the upper portion thereof, wherein sufficient air is allowed to remain for the purpose hereinafter described.

The machine thus organized operates in the following manner: Power being applied to the upper end of the pitman 15 from a windmill or other motor, so as to give said pitman a stroke of constant length, this power is transferred to the pump 26 through the medium of the piston-rod 28 and rocker 13. When the pump 11 is not in operation or is running slowly, the port 39 is opened, giving free passage to the oil from the receiver 30 through the pipe 31 to the cylinder 20, where it will force out the piston 21 and thereby move the pin 19 outward, thus increasing the distance between the point of connection of the pitman 15 to the rocker 13 and the pivotal point of said rocker. This gives the advantage of a better leverage and a short stroke, so that a slight wind may start and operate the pump 11. When the pump is in action, the downstroke of the piston 27 will force the displaced volume of oil up through the check-valve 34 in the pipe 33, the check-valve 50 closing against this pressure. After passing the check-valve 34 the oil must either pass up through the regulating valve or cock 35 or it must raise the cylindrical valve 41, or it may diverge and partially pass through each of these routes. The regulating-valve 35 must be so adjusted as to position and the valve 41 correspondingly so adjusted as to weight that below the prescribed rate of action the valve 41 will not be raised or, if raised, will return to its lowest position before another downstroke occurs, while at higher rates of action it will not have time to return between strokes, and hence will keep the port 39 closed. When in this upper or raised position, the port 40 is opened and the oil is free to pass through said port into the pipe 33. Upon the upward stroke of the piston 27 of the pump the volume of oil displaced will either pass upward through the regulating-valve 43 or will lift the cylindrical valve 48 or will partly adopt both of these routes, and these two valves, like the valves 35 and 41, will be so adjusted as to their position and weight, respectively, that at a low rate of working the valve 48 will remain in its lowermost position or will return to that position after each upstroke, thus keeping the port 47 closed, while at a higher rate of working the valve 48 will be moved upward until its port 49 coincides with the port 47, whereupon communication is opened between the pipe 32, which leads to the motor, and the pipe 42 to allow the oil to pass from the cylinder 20 of the motor back to the receiver 30. This permits an inward motion of the piston 21 and through the piston-rod 22 moves the pin 19 inward along the rocker-arm and thereby brings the lower end of the pitman 15 closer to the pivotal point of the rocker, thus decreasing the leverage and increasing the length of stroke. It should be noted that upon the upstroke a component of the force applied to the pin 19 acts against the piston 21 in the cylinder 20, and this will force the oil out of said cylinder when the port 47 is opened. For like reasons, during the downstroke oil tends to flow into the cylinder 20, but cannot do so until the port 39 is opened, the atmospheric pressure holding the piston 21 in its place. The check-valves 34 and 50 serve in an obvious manner to cause a circulation of the oil through the pipes 33 and 42 in the proper directions, and similar check-valves 53 and 54 are provided in the pipes 31 and 32 to prevent the oil from flowing in the wrong direction through the ports 39 and 47, respectively. The regulating-valves 51 and 52 in the pipes 31 and 32 serve to regulate the passage of the oil to or from the cylinder 20, and thereby give a better control of the rate of action of the governor. The cylindrical shape of the valves 41 and 48 facilitates the proper adjustment of their weight by reason of the fact that the space within said valve may be filled with shot or other similar material for the purpose of readily adjusting their weight to the requirements of the case. It will be understood, of course, that instead of relying upon the action of gravity to return these valves to their normal positions springs may be employed for this purpose, and such a construction will be employed in case the governor is so constructed or located that the valve-chambers are horizontal instead of vertical, as in the construction shown.

The sensitiveness of the governor is effected, first, by the area of the passages in the regulating-valves 35 and 43; second, the weights of or the pressure of the springs upon the valves 41 and 48, and, third, the length of stroke of the piston 27 of the pump 26, which latter may be adjusted, as hereinbefore pointed out, by varying the position of the collar 29 on the shaft 14. The entire governing apparatus is relatively quite small in size and but little power is required to operate it, only sufficient power to overcome the frictional resistance being necessary.

It will be obvious that various modifications in the details of the construction hereinbefore described and in the relative arrangement of the parts may be made without departing from the principle of my invention. For instance, the pump or compressor to be actuated from the rocker may be connected thereto at a point other than that shown—that is to say, it may be connected at a point below the pivot of the rocker instead of above the same, and the relative positions of the working points on the rocker may be varied. Other modifications will readily suggest themselves, and I therefore do not wish to be understood as limiting myself strictly to the construction herein detailed.

I claim—

1. The combination, with a windmill or other motor having a stroke of constant length, of a pump or similar engine to be driven thereby, a rocker to which the pump is eccentrically connected, a pitman connected at one end to and actuated by the windmill or other motor, said pitman being movably connected with the rocker, and a governor actuated by a moving part of the apparatus, connected with the pitman and adapted to shift the rocker end thereof toward or from the center of oscillation of the rocker upon an increase or decrease of speed, respectively, substantially as set forth.

2. The combination, with a windmill or other motor having a stroke of constant length, of a pump or similar engine to be driven thereby, a rocker to which the pump is eccentrically connected, a pitman connected at one end to and actuated by the windmill or other motor, said pitman being movably connected with the rocker, a fluid-motor mounted on the rocker and connected with the pitman, and governing devices comprising a pump whose speed is proportionate to that of the windmill or other prime mover, a receiver, pipes connecting the receiver and pump and the motor on the rocker, and suitable regulating and controlling valves whereby, upon an increase or decrease in the speed of the governor-pump, the rocker-motor will move the end of the pitman toward or from the center of oscillation of the rocker, substantially as described.

3. The combination with the rocker-arm, the pitman movably connected thereto and a fluid-motor connected to the pitman, of a pump, a receiver, a pipe extending from the pump to the receiver and having a check-valve, a regulating-valve and a by-pass comprising a valve-chamber having an inlet-port connected with the fluid-motor and a valve actuated by the fluid-pressure and controlling said inlet-port, and a second pipe extending from the receiver to the pump and having a check-valve, a regulating-valve and a by-pass comprising a valve-chamber having an outlet-port communicating with the fluid-motor and a valve in said chamber actuated by the fluid-pressure and controlling said outlet-port, substantially as described.

4. The combination, with the rocker, the pitman movably connected therewith and a fluid-motor for shifting the pitman connection, of a pump of adjustable stroke, a receiver and two pipes connecting the pump and receiver and each having a suitable check-valve, a regulating-valve controlling the area of the passage, a by-pass around said regulating-valve comprising a valve-chamber having a port communicating with the fluid-motor, and a valve of adjustable weight in said chamber, actuated by the fluid-pressure and controlling said port, substantially as described.

5. In an apparatus of the class described, the combination, with the pitman, of the rocker slotted as described, a motor mounted on the rocker and comprising a cylinder and a piston therein having its rod connected with the pitman, a duct or passage through the rocker-shaft to the cylinder, a fixed pipe connected therewith by a suitable stuffing-box, and governing devices connected with said pipe, substantially as described.

ELMO G. HARRIS.

Witnesses:
  FREDERICK C. GOODWIN,
  G. I. HARBRIDGE.